Patented Dec. 15, 1931

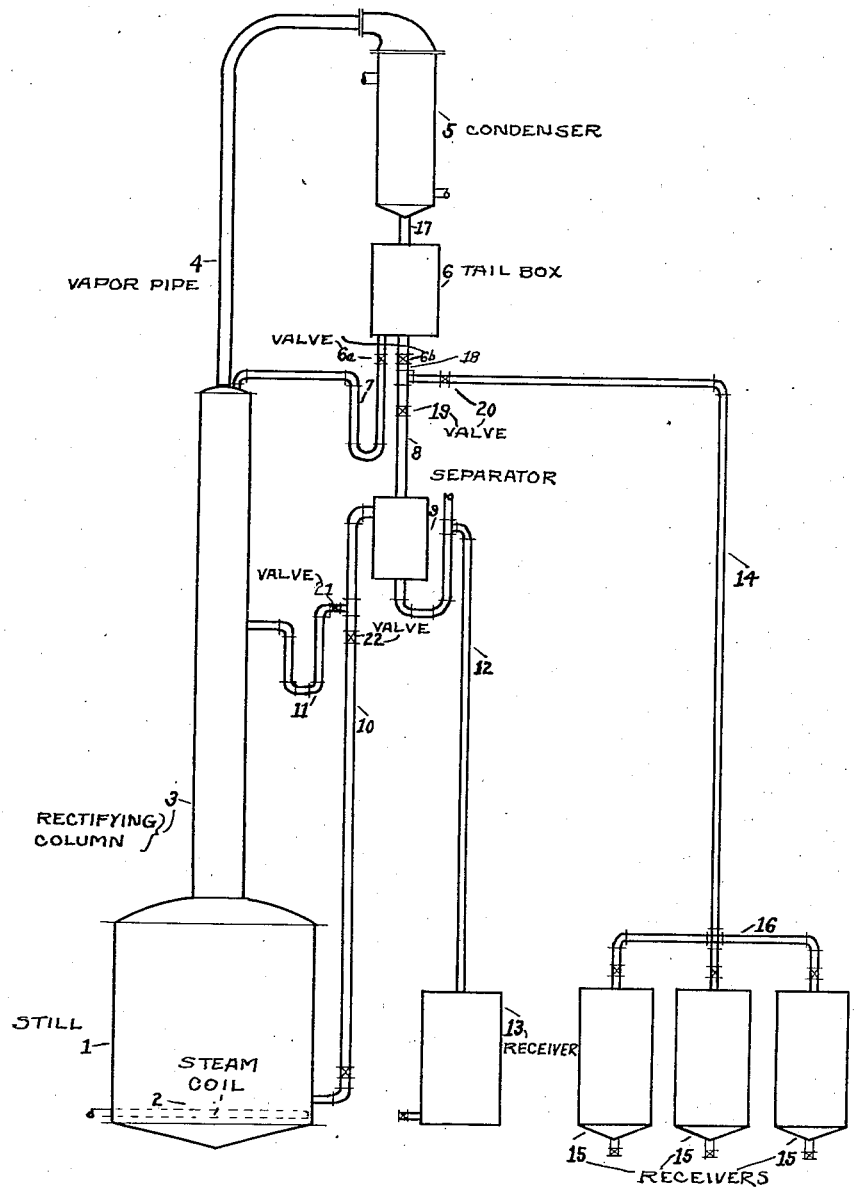

1,836,096

UNITED STATES PATENT OFFICE

ROBERT H. VAN SCHAACK, JR., OF EVANSTON, AND NORRIS BOEHMER, OF CHICAGO, ILLINOIS, ASSIGNORS TO VAN SCHAACK BROS. CHEMICAL WORKS, INC., OF CHICAGO, ILLINOIS, A CORPORATION OF ILLINOIS

PROCESS OF PURIFYING ESTERS

Application filed June 20, 1927. Serial No. 200,141.

This invention relates to a process of purifying esters, and particularly to the substantial reduction of free acidity of the crude product, without the use of alkaline neutralizing agents, together with the practical elimination of dissolved water in the product.

Crude esters, as usually made by distilling the product of the reaction between an organic acid, or its salts in admixture with sulfuric acid, and an alcohol, in the presence of a catalyst, contain considerable amounts of the free organic acid, and are practically saturated with water. They contain also much unreacted alcohol. Heretofore, it has been common practice to neutralize the free acidity of crude esters by agitating them with several portions of an aqueous solution of soda ash or other alkali, and then by redistillation, to remove the water in the form of a wet foreshot containing also much of the ester and some of the uncombined alcohol.

For example, in the production of such volatile esters as n-butyl or amyl acetate the crude or primary distillate may contain as much as 7% or more of free acetic acid and much unreacted alcohol. To neutralize this acid the material is agitated with a considerable excess of a solution of sodium carbonate. In this manner the acidity is reduced sufficiently to yield, on redistillation, a product containing less than .03% to .05% of acetic acid, the commercial limit. In this redistillation the water dissolved in the neutralized product distills first and carries with it large amounts of acetate as well as some alcohol. In the case of n-butyl acetate although the neutralized material may contain only 4% to 6% of water, it may be necessary to distill off as much as 30% of the total before the remaining amount is substantially dry.

The procedure described is inconvenient, and wasteful, as the alkali may saponify part of the ester. Moreover, it necessitates an inconvenient and costly operation to recover the acetic acid as sodium acetate, and finally the ester in the foreshot, after the separation of the free water still contains dissolved water, and hence must be rehandled.

It is the purpose of this invention to eliminate these troublesome steps by causing the free acid present in the primary or crude distillate to combine almost completely with the unreacted alcohol, at the same time bringing about the removal of the water without substantial loss of ester. The present invention brings about the result without the addition of any substance except a catalyst different in nature from those already present. At the same time it increases the percentage of ester in the finished product. The process will be described as it may be applied to the purification of n-butyl acetate. However, it is understood that the invention is not limited to the exact details of apparatus, method, or proportions set forth, nor is it confined to the treatment of n-butyl acetate, but on the other hand many other volatile esters may be treated.

A typical crude n-butyl acetate, such as results from the primary distillation of the product obtained by reacting a mixture of calcium acetate, sulfuric acid and n-butyl alcohol, may contain 75% n-butyl acetate, 5% water, 6% acetic acid, and 14% n-butyl alcohol. The reaction may be expressed by the equation:

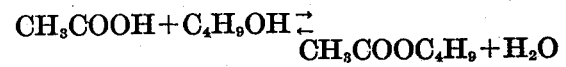

$$CH_3COOH + C_4H_9OH \rightleftarrows CH_3COOC_4H_9 + H_2O$$

This is a balanced reaction and in the primary reaction equilibrium results before all of the acetic acid is converted into the ester, and hence free acetic acid and n-butyl alcohol exist in the product. The process of the present invention provides for shifting the equilibrium and causing the reaction to proceed to the right until practically complete, by means of the removal of the free water in the crude distillate, and also of the water formed as the reaction proceeds to the right. An illustrative example of one method of practicing this invention follows. Glacial acetic acid is esterified with a 5 per cent excess of n-butyl alcohol in the presence of a few per cent of sulfuric acid. The mixture is kept near the boiling point for 4 hours and is then distilled. The oil layer is separated as crude n-butyl acetate.

The following explanation will be made clearer by reference to the drawing.

The crude n-butyl acetate together with a small amount of a catalyst, for example 0.1% of sulfuric acid is placed in a copper still or boiling vessel, 1, provided with a closed steam coil 2, by means of which the material is boiled. The vapors pass through a rectifying column 3, which may be of any standard design, and through a vapor pipe 4, to a standard water cooled tubular condenser 5. The condensed liquid which at the beginning of the process may have a composition of 25% water, 60% n-butyl acetate and 15% n-butyl alcohol passes through a pipe 17 to a tail-box 6 having two discharge pipes 7 and 18, and means for varying the ratio of the amounts of material discharged thereby such as valves 6a and 6b. Part of the material is returned to the top of the column 3, through a trapped pipe 7, and the remainder passes through pipes 18 and 8 to an automatic separator 9, where the liquid separates into two layers. The lower layer which may be termed the aqueous layer, consisting of water containing small amounts of acetic acid, n-butyl alcohol and n-butyl acetate in solution passes through a pipe 12 to a receiver 13, while the upper layer which may be termed the oil layer, consisting of a mixture of n-butyl acetate and n-butyl alcohol with a small amount of acetic acid, and saturated with water, but substantially free of mechanically carried water, passes through pipe 10 and is returned to the still 1.

At the beginning of the operation the valves 6a and 6b are set so that none of the condensate is returned through the pipe 7 to the top of the column 3, but all is delivered through pipes 18 and 8 to the automatic separator 9. After a few minutes the temperature of the vapors entering the condenser 5 rises to the neighborhood of 88° C., at which point it may remain for some time. As the operation proceeds and the amount of water present is decreased through the functioning of the separator 9, the proportion of water in the vapors arising from the still is diminished, and it becomes necessary to provide reflux liquid in column 3 in order that it may function better to rectify the vapors and build up the proportion of water to such a point that it will separate satisfactorily from the mixture. The necessity for such reflux is evidenced by the temperature of the vapors entering the condenser 5 rising substantially above 90° C. When this occurs the setting of valves 6a and 6b is changed so as to return a part of the liquid to the top of the column 3 through the pipe 7, thus maintaining the temperature in the neighborhood of 88° C., or say from 87° C. to 90° C. As occasion arises the setting of the valves is changed, so that the amount of reflux liquid passing through the pipe 7 to the top of the column 3 is increased to keep the temperature of the vapors at the point named in the neighborhood of 88°. Thus near the end of the dehydration the amount of liquid returned to the top of the column 3 may be ten or more times the amount passing to the separator 9.

As water is removed from the contents of the still 1 through the operation of the column 3 and of the separator 9, the reaction indicated by the equation hereinbefore given proceeds from left to right. Thus more water is generated which is in turn built up by the action of the column 3 to a concentration at which it can be removed in the separator 9, enabling the reaction eventually to go nearly to completion. Samples are withdrawn from the still 1 from time to time and their content of acid determined. When the acidity has been reduced from its original value of about 6% to the neighborhood of 0.1% to 0.2% or less the material is no longer sent to the separator 9, but by means of suitable valves 19 and 20 may be diverted through a pipe 14 and a header 16 to any suitable receivers 15. The product will be substantially neutral, that is it will contain less than the commercial limit of .03% acid and will be substantially free of water.

The temperature of the vapors entering the condenser 5 is kept preferably near 88° C., since at lower temperatures the percentage of water contained therein is diminished and hence the operation may be prolonged. If the temperature be allowed to rise materially higher, while the proportion of water present in the vapor may be higher, the composition is so changed as to render water more soluble in the mixture after condensation, and hence less is removed in the separator 9. However, under some conditions and for the purification of some esters other temperatures below the boiling point of water may be used, and the invention is not to be taken as limited to this one temperature. For example, under some conditions, especially in the case of esters of comparatively low boiling alcohols, it may be preferable to increase the reflux sufficiently to give a somewhat lower vapor temperature, say about 79° C., particularly near the end of the dehydration, and thus decrease further the solubility of water in the mixture.

In some cases, for instance in purifying esters of alcohols in which water has a relatively high solubility, it may be desirable, instead of returning the oil layer from the separator 9 directly to the still, to return it to the still through the lower part of the column 3 by means of suitable valves 21 and 22, and a trapped pipe 11 leading from a suitable point in the pipe 10 which goes to the still, to a point in the column 3 at which the water concentration of the partially rectified material is substantially the same as that of the oil layer. For practical purposes this point may be taken as nearly midway between the top and bottom of the column, but depends on the particular ester. This procedure is particuarly useful in the latter stages of the dehydration, and serves to remove a large portion of the water dissolved in the oil layer from the separator 9 before it reaches the liquid in the still. In the case of esters which are readily hydrolyzed such as those of formic acid it may be desirable to cause the acidity of the material in the still to be carried somewhat lower than that generally necessary (say .03%) before diverting the distillate from the separator.

The process of this invention is not adapted to the purification of esters of alcohols which are completely miscible with water, possibly because the greater solubility of water therein renders its removal by the means described difficult. In cases in which such alcohols and/or their esters are present as minor constituents, or as impurities, it may be desirable to remove them from the mixture by fractional distillation before commencing the dehydration operation described, or the dehydration process may be interrupted at some convenient time and the materials in question substantially eliminated by fractionation. Crude amyl acetate is an example of a material of the sort described, and, as made from fusel oil it may contain ethyl alcohol and ethyl acetate, which may be removed along with some water, by fractional distillation, before beginning the operation.

Additional amounts of the alcohol of the kind already present in the mixture facilitate the reaction, thus reducing the time necessary for completion of the process, and may in some cases be supplied. Such excess of the alcohol might tend to increase the solubility of water in the mixture distilling, but this tendency is counteracted by the efficient action of the rectifying column, which limits the amount reaching the separator.

Other esters than crude n-butyl acetate may be treated by this process, such as crude sec-butyl acetate, amyl acetate, butyl propionate, butyl butyrate, butyl oxalate, etc. Catalysts other than sulfuric acid, such as hydrogen chloride, phosphoric acid or zinc chloride are not precluded, and quantities of catalyst other than those mentioned may be utilized. Or in some instances no catalyst need be used, if a long reaction time is not objectionable.

It may be preferred by some to run the condensate directly from the condenser to the separator, placing the tailbox and its valve system in the line which handles the oil layer therefrom, and returning said oil layer partly to the top of the column and partly to the still as needed.

The upper limit of acidity permissible in the dehydrated material may vary within considerable limits and depends in part upon the rate of distillation and degree of column efficiency during the first part of the final distillation, as well as on the limit of acidity desired in the finished product.

The process described is capable of being carried out in a number of forms of apparatus and the particular form described though convenient and efficient is subject to considerable variation.

When large excesses of the alcohol have been used, it may be preferable in some cases after the acidity of the material has been reduced to the desired point, to remove by careful fractionation a mixture rich in the alcohol, thereby further raising the ester value of the remainder. In the case of n-butyl alcohol and n-butyl acetate, a constant boiling mixture may be removed, which boils lower than the alcohol.

By the term "crude ester" as used in the claims is meant one which contains in solution water, and/or uncombined alcohol and/or free organic acid, in amounts in excess of those commercially acceptable.

By the term "volatile ester" as used in the claims is meant one which, like the examples given, may be distilled under atmospheric pressure without decomposition, and which when distilled in the presence of water and the alcohol from which the ester is derived, yields vapors comprising a ternary mixture of the three substances.

What we claim is:

1. The process of purifying crude volatile esters of alcohols not completely miscible with water which comprises adding an esterification catalyst thereto, boiling the mixture, increasing the water concentration in the ternary mixture of vapors therefrom by rectification, continuously separating the liquid condensed from the vapors into aqueous and oil layers, and returning the oil layer to the remainder of the original mass until the free acid in the ester is substantially completely reacted, and then distilling the mixture whereby a substantially neutral and water-free product is obtained.

2. The process of purifying crude volatile esters of alcohols not completely miscible with water which comprises adding an esterification catalyst, thereto, boiling the mixture, removing therefrom a ternary mixture of vapors having a boiling point below 100° C., increasing the water concentration in said vapors by rectification, continuously separating the liquid condensed from the vapors into aqueous and oil layers, and returning the oil layer to the remainder of the original mass until the free acid in the ester is not substantially more than 0.2%, and then distilling the mixture whereby a substantially neutral and water-free product is obtained.

3. The process of purifying crude volatile esters of alcohols not completely miscible with water, which comprises removing the water by fractionation, causing substantially all of the free acid contained therein to react with the free alcohol contained therein, and distilling whereby a substantially neutral and water-free product results.

4. The process of purifying crude volatile acetic esters of alcohols not completely miscible with water which comprises adding an esterification catalyst thereto, boiling the mixture, removing therefrom a ternary mixture of vapors having a boiling point below 100° C., increasing the water concentration in said vapors by rectification, continuously separating the liquid condensed from the vapors into aqueous and oil layers, and returning the oil layer to the remainder of the original mass until the free acetic acid in the ester is substantially completely reacted, and then distilling the mixture whereby a substantially neutral and water-free product is obtained.

5. The process of purifying n-butyl acetate which comprises adding an esterification catalyst thereto, boiling the mixture, removing therefrom a ternary mixture of vapors having a boiling point below 100° C., increasing the water concentration in said vapors by rectification, continuously separating the liquid condensed from the vapors into aqueous and oil layers, and returning the oil layer to the remainder of the original mass until the free acetic acid in the ester is substantially completely reacted, and then distilling the mixture whereby a substantially neutral and water-free product is obtained.

6. The process of purifying crude volatile esters of alcohols not completely miscible with water which comprises adding an esterification catalyst thereto, boiling the mixture, removing therefrom a ternary mixture of vapors having a boiling point below 100° C., increasing the water concentration in said vapors by means of rectification, continuously separating the liquid condensed from the vapors into aqueous and oil layers, and returning the oil layer to the partially rectified material as it distils, until the free acid in the ester is substantially completely reacted, and then distilling the mixture whereby a substantially neutral and water-free product is obtained.

7. The process of decreasing the acidity of crude volatile acetic esters of alcohols not completely miscible with water, which comprises the step of removing water by fractionation and causing substantially all of the free acetic acid to react, in the presence of a catalyst and in the substantial absence of any added substance different from the substances already present, with the free alcohol contained therein.

8. The process of decreasing the acidity of n-butyl acetate which comprises the step of removing water by fractionation and causing substantially all of the free acetic acid to react, in the presence of a catalyst and in the substantial absence of any added substance different from the substances already present, with the free n-butyl alcohol contained therein.

9. The process of purifying crude volatile esters of alcohols not completely miscible with water which comprises adding an esterification catalyst thereto, boiling the mixture, increasing the water concentration in the mixture of vapors therefrom by rectification, without the addition of a substantial amount of any substance different from those already present, continuously separating the liquid condensed from the vapors into aqueous and oil layers, and returning the oil layer to the remainder of the original mass until the free acid in the ester is substantially completely reacted, and then distilling the mixture whereby a substantially neutral and water-free product is obtained.

10. The process of purifying crude volatile esters of alcohols not completely miscible with water which comprises adding an esterification catalyst, thereto, boiling the mixture, removing therefrom without the addition of a substantial amount of any substance different from those already present, a mixture of vapors comprising a substantial amount of ester, increasing the water concentration in said vapors by rectification, continuously separating the liquid condensed from the vapors into aqueous and oil layers, and returning the oil layer to the remainder of the original mass until the free acid in the ester is not substantially more than 0.2%, and then distilling the mixture whereby a substantially neutral and water-free product is obtained.

11. The process of purifying n-butyl acetate containing free acetic acid and n-butyl alcohol which comprises adding an esterification catalyst thereto, boiling the mixture, removing therefrom without the addition of a substantial amount of any substance different from those already present, a ternary mixture of vapors comprising a substantial amount of ester, increasing the water concentration in said vapors by rectification, continuously separating the liquid condensed from the vapors into aqueous and oil layers, and returning the oil layer to the remainder of the original mass until the free acetic acid in the ester is substantially completely reacted, and then distilling the mixture whereby a substantially neutral and water-free product is obtained.

12. The process of purifying crude volatile esters of alcohols not completely miscible with water which comprises adding an esterification catalyst thereto, boiling the mixture, removing therefrom without the addition of a substantial amount of any substance different from those already present, a ternary mixture of vapors having a boiling point below 100° C., increasing the water concentration in said vapors by rectification, continuously separating the liquid condensed from the vapors into aqueous and oil layers, and returning the oil layer to the partially rectified material as it distils until the free acid in the ester is substantially completely reacted, and then distilling the mixture whereby a substantially neutral and water-free product is obtained.

13. The process of purifying crude volatile esters of primary alcohols not completely miscible with water which comprises boiling the mixture in the presence of an esterification catalyst, increasing the water concentration in the ternary mixture of vapors therefrom by rectification, continuously separating the liquid condensed from the vapors into aqueous and oil layers, and returning the oil layer to the remainder of the original mass until the free acid in the ester is substantially completely reacted, and then distilling the mixture whereby a substantially neutral and water-free product is obtained.

14. The process of purifying crude volatile esters of primary alcohols not completely miscible with water which comprises boiling the mixture in the presence of an esterification catalyst, removing therefrom a mixture of vapors having a boiling point below 100° C., increasing the water concentration in said vapors by rectification, continuously separating the liquid condensed from the vapors into aqueous and oil layers, and returning the oil layer to the remainder of the original mass, until the free acid in the ester is not substantially more than 0.2%, and then distilling the mixture whereby a substantially neutral and water-free product is obtained.

15. The process of purifying crude volatile esters of primary alcohols not completely miscible with water which comprises removing the water by fractionation and causing substantially all of the free acid contained therein to react with the free alcohol contained therein, and distilling whereby a substantially neutral and water-free product results.

16. The process of purifying crude volatile esters of primary alcohols not completely miscible with water which comprises boiling the mixture in the presence of an esterification catalyst, removing therefrom a ternary mixture of vapors having a boiling point below 100° C., increasing the water concentration in said vapors by means of rectification, continuously separating the liquid condensed from the vapors into aqueous and oil layers, and returning the oil layer to the partially rectified material as it distils from the remainder of the original mass, until the free acid in the ester is substantially completely reacted, and then distilling the mixture whereby a substantially neutral and water-free product is obtained.

R. H. VAN SCHAACK, Jr.
NORRIS BOEHMER.